United States Patent
Price et al.

(10) Patent No.: US 11,288,731 B2
(45) Date of Patent: *Mar. 29, 2022

(54) PERSONALIZED CAR RECOMMENDATIONS BASED ON CUSTOMER WEB TRAFFIC

(71) Applicant: Capital One Services, LLC, McLean, VA (US)

(72) Inventors: Micah Price, Plano, TX (US); Qiaochu Tang, The Colony, TX (US); Jason Hoover, Grapevine, TX (US); Geoffrey Dagley, McKinney, TX (US); Avid Ghamsari, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/005,832

(22) Filed: Aug. 28, 2020

(65) Prior Publication Data

US 2021/0201381 A1    Jul. 1, 2021

Related U.S. Application Data

(63) Continuation of application No. 16/728,551, filed on Dec. 27, 2019, now Pat. No. 10,796,355.

(51) Int. Cl.
| | | |
|---|---|---|
| *G06Q 30/06* | (2012.01) | |
| *G06N 20/00* | (2019.01) | |
| *G06F 16/2457* | (2019.01) | |
| *G06F 16/9535* | (2019.01) | |

(52) U.S. Cl.
CPC ... *G06Q 30/0631* (2013.01); *G06F 16/24578* (2019.01); *G06F 16/9535* (2019.01); *G06N 20/00* (2019.01); *G06Q 30/0613* (2013.01); *G06Q 30/0623* (2013.01); *G06Q 30/0641* (2013.01)

(58) Field of Classification Search
CPC .......... G06Q 30/0631; G06Q 30/0641; G06Q 30/0623; G06Q 30/0613; G06F 16/9535; G06F 16/24578; G06N 20/00
USPC ................ 705/26.7, 26.61, 26.41, 26.5, 27.1
See application file for complete search history.

(56) References Cited

U.S. PATENT DOCUMENTS

| | | | |
|---|---|---|---|
| 8,280,888 B1 | 10/2012 | Bierner et al. | |
| 8,412,698 B1 | 4/2013 | Sarukkai | |
| 8,447,758 B1 | 5/2013 | Adler et al. | |
| 8,515,893 B2 | 8/2013 | Wilson et al. | |
| 8,589,399 B1 * | 11/2013 | Lee ....................... | G06F 16/313 |
| | | | 707/737 |
| 8,909,626 B2 | 12/2014 | Park et al. | |
| 9,852,228 B2 | 12/2017 | Martin | |

(Continued)

FOREIGN PATENT DOCUMENTS

CN    109933714 A  *  6/2019  ........... G06F 16/953

*Primary Examiner* — Yogesh C Garg
(74) *Attorney, Agent, or Firm* — Kacvinsky Daisak Bluni PLLC

(57) ABSTRACT

One or more embodiments are generally directed to techniques to provide specific vehicle recommendations. Various techniques, methods, systems, and apparatuses include utilizing user web-traffic and/or one or more tags generated by application of a machine learning model to a data source, where the data source may include language with respect to one or more automobiles or vehicles, to provide a recommendation for a particular automobile.

20 Claims, 8 Drawing Sheets

(56) References Cited

U.S. PATENT DOCUMENTS

| | | |
|---|---|---|
| 10,515,147 B2 | 12/2019 | Moore et al. |
| 2005/0065774 A1 | 3/2005 | Doganata et al. |
| 2005/0240580 A1 | 10/2005 | Zamir et al. |
| 2009/0094231 A1 | 4/2009 | Marvit et al. |
| 2009/0204609 A1 | 8/2009 | Labrou et al. |
| 2009/0327279 A1 | 12/2009 | Adachi et al. |
| 2010/0145954 A1 | 6/2010 | Barlin et al. |
| 2010/0274821 A1 | 10/2010 | Bernstein et al. |
| 2011/0029636 A1 | 2/2011 | Smyth et al. |
| 2013/0290905 A1* | 10/2013 | LuVogt ............... G06N 3/006 715/835 |
| 2014/0067846 A1 | 3/2014 | Edwards et al. |
| 2016/0012507 A1 | 1/2016 | Narin |
| 2016/0179967 A1* | 6/2016 | Sa ................. G06F 16/3346 707/730 |
| 2016/0292759 A1* | 10/2016 | Gonzalez Miranda ................. G06F 3/04847 |
| 2017/0169027 A1* | 6/2017 | Ben-Tzur ........... G06F 16/2425 |
| 2017/0235464 A1* | 8/2017 | Ben-Tzur ........... G06F 3/04845 715/739 |
| 2018/0232441 A1 | 8/2018 | Lin et al. |
| 2019/0266158 A1 | 8/2019 | Bolla et al. |
| 2020/0152073 A1* | 5/2020 | Kim ................. H04W 4/80 |
| 2020/0226418 A1 | 7/2020 | Dorai-Raj et al. |

\* cited by examiner

SYSTEM 406

PERSONALIZED CAR RECOMMENDATIONS BASED ON CUSTOMER WEB TRAFFIC

CROSS-REFERENCE TO RELATED APPLICATIONS

This application is a continuation of U.S. patent application Ser. No. 16/728,551, entitled "PERSONALIZED CAR RECOMMENDATIONS BASED ON CUSTOMER WEB TRAFFIC" filed on Dec. 27, 2019. The contents of the aforementioned application are incorporated herein by reference in their entirety.

BACKGROUND

The present embodiments relate to machine learning, and more particularly machine learning to provide automobile information to users.

Electronic data sources, for information or otherwise, may be accessed by users interested in products and/or services. However, current systems, including search engines, suffer in the quality of delivering information concerning products and services.

SUMMARY

One aspect of the present disclosure includes a computer implemented method, where the method can include storing a plurality of tags on a host device, the plurality of tags related to a plurality of automobile makes and models. The method may include aggregating automobile data on one or more web pages accessed by a user on a user device. The method may further include comparing one or more automobile terms associated with the aggregated automobile data to the plurality of automobile tags stored on the host device to identify a subset of the plurality of automobile makes and models associated with the aggregated automobile data. The method may include transmitting a suggestion, the suggestion including at least one of i) information identifying at least one particular automobile of the subset of automobile makes and models and ii) information identifying a subset of the plurality of tags associated with the subset of automobile makes and models.

Yet another aspect of the present disclosure includes an apparatus for providing a vehicular recommendation to a user. The apparatus can include: memory to store instructions, and processing circuitry, coupled with the memory, operable to execute the instructions, that when executed, cause the processing circuitry to aggregate automobile data source accessed by a user on one or more web pages on a user device. The instructions may further cause the processor to store the aggregated automobile data on a host device and generate a plurality of tags related to a plurality of automobile makes and models based on another data source. The instructions may further cause the processor to transmit a suggestion to the user for a particular automobile based on i) the generated plurality of tags and ii) the data source accessed by the user.

Yet another aspect of the present disclosure includes non-transitory computer-readable storage medium storing computer-readable program code executable by a processor to aggregate automobile data on one or more web pages accessed by a user on a user device. The computer-readable program code executable may be executable by the processor to compare one or more automobile terms associated with the aggregated automobile data to a plurality of automobile tags stored on a host device to identify a subset of the plurality of automobile makes and models associated with the aggregated automobile data, wherein the plurality of tags are generated from a frequency-based machine learning model applied to a corpus of automobile reviews. The computer-readable program code executable may be executable by the processor to transmit a particular automobile suggestion to a user utilizing the aggregated automobile data and the plurality of tags.

DETAILED DESCRIPTION

Figure 1:
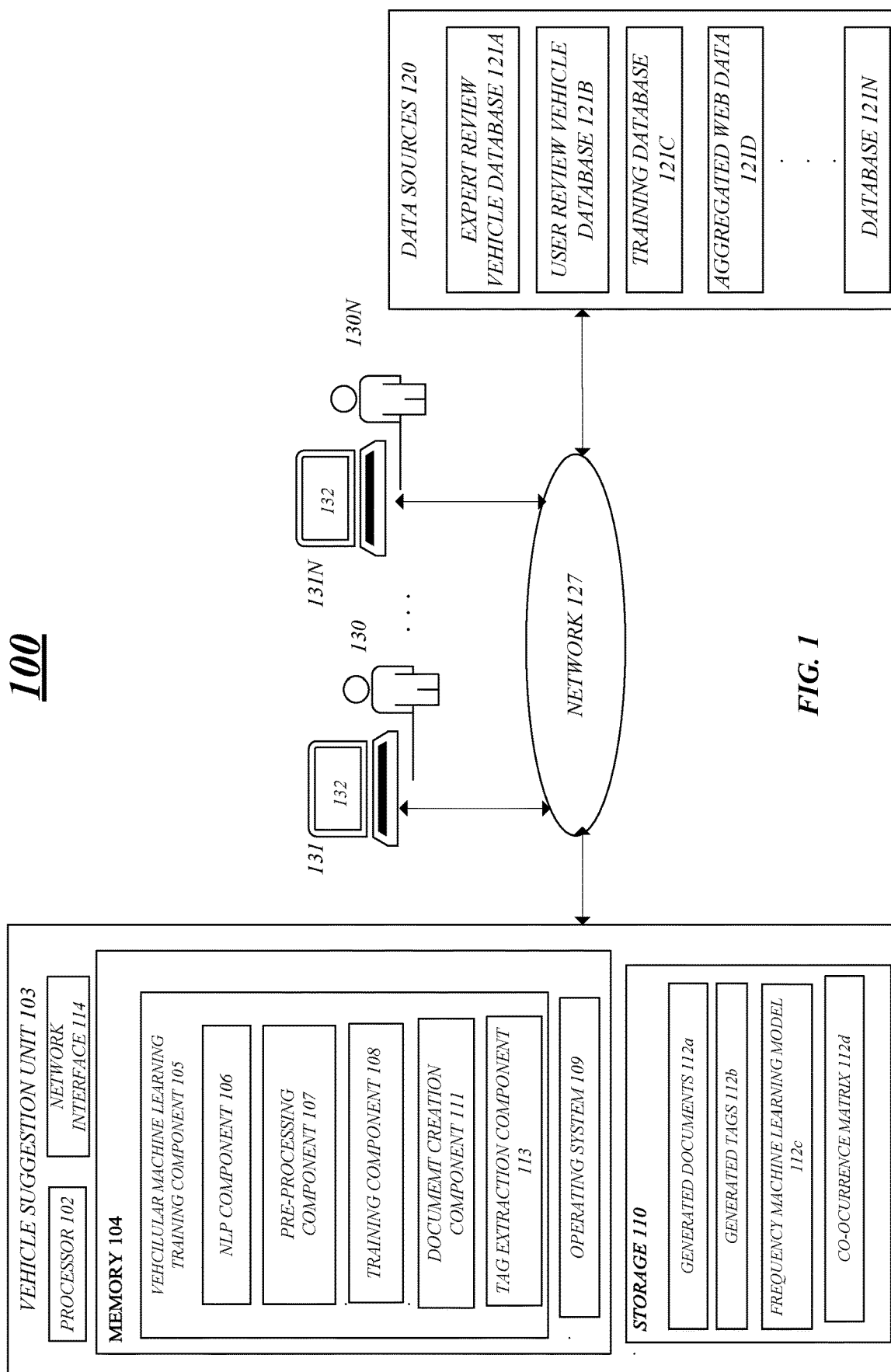
FIG. 1 illustrates an example of a system for providing vehicular information according to at least one embodiment of the present disclosure.

One or more embodiments are generally directed to techniques, systems, and processing flows to improve the functionality of natural language systems and processors in processing data with respect to automobiles, such as cars, motorcycles, boats or any other suitable vehicle associated with transportation. One or more embodiments include a vehicle suggestion system that can provide a specific automobile suggestion to a user. In one or more embodiments, the vehicle suggestion system utilizes a vocabulary comprising a plurality of tags that are generated using machine learning techniques in order to provide a particular automobile suggestion to one or more users. The plurality of tags may map to vehicle make and/or model, and the vehicle suggestion system may further leverage an aggregation of occurrences of the vocabulary in user search data.

In one or more embodiments, the plurality of tags can be stored on any suitable computer device, such as a host device, e.g. server, and can be utilized in conjunction with other data sources to make a determination as to user preferences or requirements with respect to one or more vehicles or vehicle features. For example, a local device, e.g. mobile device, can be embedded with a web browser plugin (which may be referred to as a web-plug-in) that scans and stores a user's web history (also referred to as browsing history). The web-plug-in can aggregate the web history as a data source, communicate with the host device, and compare the plurality of tags in relation to the web-history to determine a preferred vehicular feature of a user. In one or more embodiments, the combination of considering both the plurality of tags generated from a corpus of reviews and aggregated web-page history of a user increases the accuracy that a correct recommendation and/or selection based on a user's vehicular preferences is made by an applicable system.

Reference is now made to the drawings, wherein like reference numerals are used to refer to like elements. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1 illustrates an example of a vehicular suggestion system 100 that can provide a specific automobile suggestion or recommendation to a user. The "units" or "components" described in the system, whether contained in memory or otherwise employed therein, can be any suitable software, logic (hardware or software), or hardware element specifically configured to perform or be used in the performance of one or more tasks or functions as discussed herein.

In one or more embodiments, the vehicular suggestion system 100 can include a vehicle suggestion unit 103, which in turn includes one or more processors 102, memory 104, storage 110 and a network interface 114. In one or more embodiments, the vehicle suggestion unit 103 can be part of a host system, e.g. one or more servers, of an entity, e.g. business or corporation, that supplies information related to vehicles, vehicular features, automobiles, and/or automobile features, including recommendations for the same. The one or more processors 102 can be any suitable software or hardware computer components for carrying out any operation as discussed herein. The memory 104 can be any suitable component or unit for storing protocols, information, algorithms, and/or instructions for execution by the one or more processors, e.g., the memory 104 may be any volatile and/or non-volatile memory capable of storing information during and/or for the execution of instructions. The devices, systems, sources, units and/or components of the vehicle suggestion unit 103 can be coupled to a network 127, e.g., the Internet, via one or more wired and/or wireless network links, and can be accessed by one or more network interfaces 114.

In one or more embodiments, the vehicle suggestion unit 103 can interact with one or more users or clients 130 . . . 130N (and associated user/client computing devices 131 . . . 131N, e.g., a laptop, mobile phone, tablet, or desktop computer) via a network interface 114 that can access the network 127. The vehicle suggestion unit 103 can interact with one or more data databases or data sources 120 also via the network interface accessing the network 127, wherein one or more embodiments the one or more data sources can include an expert review vehicle database (or expert review vehicle database) 121A, a user review vehicle database (or user review vehicle database) 121B, a training set database (e.g., based on data in one or more databases 121A, 121B and/or other sources) and other databases, such as 121N. In one or more embodiments, the vehicle suggestion unit 103 can be or include a web-plug-in 132 configuration installed or otherwise configured to run directly on computing devices 131 . . . 131N.

In one or more embodiments, the vehicle suggestion unit 103 can configure a web-plug-in 132 that is configured and/or installed on one or more user devices 131 . . . 131N, and useful for determining when the one or more users 131 . . . 131N are reviewing information related to vehicles, vehicular features, automobiles, and/or automobile features, including web-traffic, web-page and/or web-site visits concerning the same. In at least one embodiment, the web-plug-in 132 executes within a web browser (not pictured). More generally, the web-plug-in 132 monitors and records information describing web pages visited by users, search queries submitted by users to search engines, and any other data describing the web history and/or the browsing history of one or more users. In various embodiments, the web-plug-in 132 can aggregate text data and/or visual data associated with the web-history and/or pages reviewed by the one or more users 131 . . . 131N, including information from web-pages concerning vehicles, vehicular features, automobiles, and/or automobile features. The vehicle suggestion unit 103 and/or the web-plug-in 132 may be invoked to perform the operations described herein periodically and/or responsive to user input.

In one or more embodiments, the memory 104 can include a vehicular machine learning training component 105 and an operating system 109, where the operating system 109 can be any suitable operating system compatible with system 100. In one or more embodiments, the vehicular machine learning training component 105 can further include a natural language processing component ("NLP") 106, a pre-processing component 107, a training component 108, a document creation component 111, and a tag extraction component 113. In one or more embodiments, the one or more components of the vehicle suggestion unit 103 process data from the data sources 120, and based on one or more tags generated from processed information associated with data sources or databases 120, provide a specific vehicular suggestion to the one or more users 130 . . . 130N and/or one or more tags via a display associated with the one or more user computing devices 131 . . . 131N. In at least one embodiment, the vehicle suggestion unit 103 may output suggestions to users responsive to a request (e.g., a search request specifying a vehicle and/or attribute). In other embodiments, the vehicle suggestion unit 103 may output suggestions without requiring such a user request, such as when the user is viewing a web page related to automobiles. In these embodiments, the web-plug-in 132 may cause the suggestions to be outputted based on the monitored web history and/or search history of the user.

In one or more embodiments, the vehicle suggestion unit 103 is configured to provide a chatbot to the one or more users 130 . . . 130N via the one or more user computing devices 131 . . . 131N, where the chatbot provides general questions to the one or more users 130 . . . 130N about what vehicle type, feature, or make and model the one or more users 130 . . . 130N are interested in, where the one or more users 130 . . . 130N provide a response to the chatbot, and where the chatbot, as configured by the vehicle suggestion unit 103, provides a specific vehicular suggestion and/or one or more tags to the one or more users 130 . . . 130N based on the input. In one or more embodiments, the chatbot, display, or interface associated with receiving the input from the one or more users 130 . . . 130N can be configured by the tag extraction component 113 to utilize one or more tags 112b generated by the tag extraction component 113 (discussed in greater detail below) as a filter in relation to an input from the one or more users 130 . . . 130N, e.g., matching one or more tags, with an associated probability in relation to one or more vehicle or automobile features, to language associated with an input from the one or more users 130 . . . 130N. In various embodiments, the one or more tags can be part of a co-occurrence matrix 112d that is stored in storage 110 and can be generated by the tag extraction component 113.

In one or more embodiments, whether a chatbot scheme is used or whether the vehicle suggestion unit 103 can be configured to cause the display of the computing devices 131 . . . 131N to provide a single field that can handle the entirety of a request provided by the one or more users 130 . . . 130N, the functionality of the overall system 100 may be improved by having a single interface that can accommodate the entire user request, as opposed to requiring multiple fields, where each field requires a specific feature to be searched in a database in order to provide a specific vehicle suggestion to the one or more users 130 . . . 130N.

In one or more embodiments, the vehicle suggestion unit 103, in lieu of or in addition to any entered user request, can be configured to receive data from the one or more user devices 131 . . . 131N, e.g., from the web-plug-in 132. The received data can be data related to the web traffic browsed by the one or more users 130 . . . 130N, where, in one or more embodiments, as stated and implied herein, the vehicle suggestion unit 103 can install and/or configure a web-plug-in 132 on the one or more user devices 131 . . . 131N to track the web history and/or search history of users. In one or more embodiments, in lieu of an entered user request, the web-plug-in 132 can determine when a suggestion or recommendation to a user concerning a vehicular or automotive features should be supplied to the one or more users 130 . . . 130N, e.g. after a threshold amount of material has been reviewed (based on a text based analysis) and/or after a certain time has elapsed of the user reviewing (and/or ceasing to review) automotive or vehicular information on web pages.

In one or more embodiments, the NLP component 106 may receive and process a natural language input from the expert review vehicle database 121A, the user vehicle review database 121B, the training database 121C, and/or the database 121N. The natural language input can be in text form or any other suitable form for processing by the NLP component 106.

In one or more embodiments, the expert review vehicle database 121A may have language provided by experts concerning vehicles and associated features, e.g., "a family-friendly vehicle" or "a vehicle that will make your friends jealous," etc. The language can be part of a review that associates the language with a particular vehicular or automotive feature, e.g., an automobile with a V-6 engine, or a specific make and model provided by a particular manufacturer. For example, "an automobile with a V-6 engine will make your friends jealous" or "Model X made by manufacturer Y is a family-friendly vehicle" or "Model X made by manufacturer Y is a family-friendly vehicle because it has large cargo space," etc. The vehicle(s) discussed in the expert review vehicle database 121A can be automobiles, such as cars, motorcycles, boats, planes, or any other system(s) for facilitating mechanical transportation from one point to another. In one or more embodiments, the database 121A can be directed exclusively to cars with the reviews being provided by individuals with established expertise in the automotive field, such as mechanics, individuals with years of writing experience for particular automotive publications, etc.

Similarly, in one or more embodiments, the user review vehicle database 121B may have language provided by vehicle users concerning vehicles and associated features, e.g., "my vehicle is a road-buster" or "my friends love this car," etc. In one or more embodiments, the language may be part of a review that associates the language with a particular vehicular or automotive feature, e.g., fuel efficiency (a specific metric associated therewith), engine size, or horsepower, or a specific make and model provided by a particular manufacturer. For example, "my friends love my car because it has a V-6 engine" or "my Model X made by manufacturer Y is a family-friendly vehicle" or "my Model X made by manufacturer Y is a family-friendly vehicle because it has large cargo space," etc. The vehicle(s) discussed in the user review vehicle database 121B can be automobiles, such as cars, motorcycles, boats, planes, or any other system(s) for facilitating mechanical transportation from one point to another. In one or more embodiments, the database 121B can be directed exclusively to cars with the reviews being provided by individuals that own, owned, used, have used, or otherwise experienced particular automobiles and/or vehicles.

In one or more embodiments, the training database 121C vehicle databases and 121N can be additional expert review vehicle databases, user review vehicle databases, databases containing the location of vehicles for sale, the price range of vehicles generally or based on location, e.g., nationally vs. a specific location, such as a city or town, vehicle safety ratings, reviews for vehicles by customers, or any other information related to vehicles. As with database 121A, the vehicle(s) discussed in databases 121C and 121N can be automobiles, such as a car, motorcycles, boats, planes, or any other system(s) for facilitating mechanical transportation from one point to another, wherein one or more embodiments, the databases 121C . . . 121N are exclusively related to cars. In one or more embodiments, database 121C contains portions of databases 121A and 121B that can be used to train one or more machine learning models.

In one or more embodiments, the NLP component 106 can have a filtering mechanism to ensure that the database 121A is in fact an expert review vehicle database (or another kind of database as may be desirable), where the filtering mechanism can be a pre-configuration by a system designer, e.g., directing the system to a known expert publication database publicly available over the Internet, a matching mechanism that matches known expert reviewer names to a database (not shown) of known names for providing expert reviews, a threshold mechanism that looks for a certain number of known reviewers in the corpus of the database 121A before determining that the corpus of one or more expert reviews is an expert review repository (or for a certain number of assertions that particular reviews are expert reviews), any other suitable mechanism for making a determination that the expert review vehicle database 121A is in fact sufficiently populated with information that can be considered as expert reviews, or any combination therewith.

Similarly, in one or more embodiments, the NLP component 106 can have a filtering mechanism to ensure that the database 121B is in fact a user review vehicle database (or another kind of database as may be desirable), where the filtering mechanism can be a pre-configuration by a system designer, e.g., directing the system to a known user publication or comment database publicly available over the Internet, a matching mechanism that looks for media evidence that a particular user owns or has experienced a particular automobile (such as a picture or video using the vehicle), a threshold mechanism that looks for a certain number of community approvals with respect to one or more users, or any other suitable mechanism for making a determination that the expert review vehicle database 121A is in fact sufficiently populated with information that can be considered as user reviews, or any combination therewith.

In one or more embodiments, database 121N contains information related to online sources, such as websites and web addresses that discuss, sell, advertise or otherwise are associated with vehicular or automobile information, such as auction sites, commercial sites with descriptions, e.g. descriptions, of vehicles and/or automobiles. In one or more embodiments, database 121N can contain a list of terms related to the description of vehicles, automobiles, vehicular features, and/or automobile features. In one or more embodiments, the web plug-in 132 detects when one or more users 130 . . . 130N is reviewing material associated with vehicles, vehicular features, automobiles, or automobile features by being either pre-configured with the information of database 121N and/or accessing the information of database 121N to make the determination. For example, the functionality of the NLP component 106 can be embedded with respect to the web-plug-in 132 and/or the web-plug-in 132 can communicate with the NLP component 106 and/or access the information in the data sources 120 such that when the one or more users 130 . . . 130N access material via the internet or otherwise, e.g. websites, that are related to vehicles, vehicular features, automobiles, and/or automobile features, the web-plug-in 132 can make a determination as to the nature of the reviewed material in relation thereto.

In one or more embodiments, once the web-plug-in 132 determines that the material being reviewed by the one or more users 130 . . . 130N is related to vehicular or automobile information, the web-plug-in 132 can aggregate the information, which in turn can be processed by any suitable component of the vehicle suggestion unit 103, including the training component 108. As another example, by monitoring the operations performed by the user, the web-plug-in 132 may identify search queries submitted by users that are related to vehicles and/or identify web pages or other web-based content that are associated with vehicles. The web-plug-in 132 may then transmit the monitored web history (including pages visited, search queries submitted, and/or any other browsing data) to the data sources 120 for storage. In one or more embodiments, the web-plug-in 132 stores the monitored data as aggregated web data 121D in data sources 120, where the data can be used by any suitable component of system 100. In various embodiments, the aggregated web data 121D is local only to the relevant user device, e.g. 131 . . . 131N, associated with a particular user 130 . . . 130N. In one or more embodiments the aggregated web data 121D includes search strings entered by a plurality of users into one or more search engines, e.g., via the devices 131. In some embodiments, the web-plug-in 132 may locally store the aggregated web data 121D. Regardless of the storage location, the web-plug-in 132 may use the aggregated web data 121D (e.g., search history, browsing history, and/or current web page being viewed) to provide one or more relevant vehicle suggestions to a user.

As discussed herein, web-plug-in 132 may monitor and record web pages visited and/or searched for by each respective user. Furthermore, in some embodiments, when a user accesses a vehicle-related web page, the web-plug-in 132 may display a popup window or otherwise display content in the interface including a recommended vehicle on the vehicle-related web page. The recommended vehicle may be relevant to the current page, the user's browsing history, and/or the user's search history, and may be based on the feature extraction techniques described herein. In one or more such embodiments, the content outputted by the web-plug-in 132 (e.g., one or more recommended vehicles) may include a feature that is selectable to navigate the user to a platform where more information is provided for the selected recommended vehicle. For example, the web-plug-in 132 may suggest vehicle A to the user in the popup window based on monitored search queries and/or visited pages. In such an example, the web-plug-in 132 may determine that the user has submitted multiple search queries for a "rugged" vehicle and select vehicle A based on one or more tags describing vehicle A as being rugged. The web-plug-in 132 may further provide a link to a search engine which may return inventory of vehicle A, e.g., at a dealership.

In some embodiments, the popup window generated by web-plug-in 132 may recommend a type of vehicle (e.g., sports cars, sports utility vehicles, etc.) rather than a specific make and/or model of vehicle. In such embodiments, the web-plug-in 132 may further provide a link that allows the users to search related vehicles (e.g., one or more sports car makes/models, etc.) that the user may be interested in. Furthermore, regardless of the type of recommendations provided in the popup window, the web-plug-in 132 may navigate the user to an application associated with the vehicle suggestion unit 103 and/or a third party system.

Furthermore, the vehicle suggestion unit 103 and/or the web-plug-in 132 may update a profile of the user based on the activity (e.g., web pages visited, submitted search queries, etc.) observed by the web-plug-in 132 as described herein. The profile may be updated upon a threshold determination of a potential interest by the user in one or more vehicle features, types, characteristics, etc. Such a profile may be part of or accessible to a proprietary platform (or one or more third party platforms) providing a web application or mobile application for searching or purchasing vehicles. For example, one such platform may include the Auto Navigator® by Capital One®, located at https://www.capitalone.com/cars/, that enables users to search for and obtain financing information for vehicles. Other platforms may include vehicle dealership systems or other types of vehicle search systems. A user's profile associated with the Auto Navigator, for example, or one or more other platforms, may be updated based on the user's browsing history, search history, web pages visited, etc. Doing so may allow the other systems to provide personalized vehicle recommendations to the users based at least in part of their web activity when the user visits the web properties of the systems.

In one or more embodiments, the training component 108 of the vehicular machine learning training component 105 generates one or more suitable machine learning models that can be used to generate one or more tags 112b, which in turn can be used to provide specific vehicle and automobile suggestions. In one or more embodiments, the machine learning model(s), as discussed in greater detail with respect to FIG. 2A can be word frequency machine learning model(s) 112c. The training component 108 can train the one or more machine learning models, e.g., 112c, based on data provided by the one or more databases 120, including but not limited to the training database 121C, which can include parts of one or more of the expert review vehicle database 121A and/or the vehicle database(s) 121B . . . 121N. In one or more embodiments, when the training component 108 utilizes the training database 121C to train the one or more models, and when the training database 121C contains data associated with either one or both of the expert review vehicle database 121A and/or the user review vehicle database 121B (or any other database used to generate tags after training), then that data is removed if the one or more machine learning models are applied to either one or both of the expert review vehicle database 121A and/or the user review vehicle database 121B (or any other database) to generate the tags.

Figure 2A:
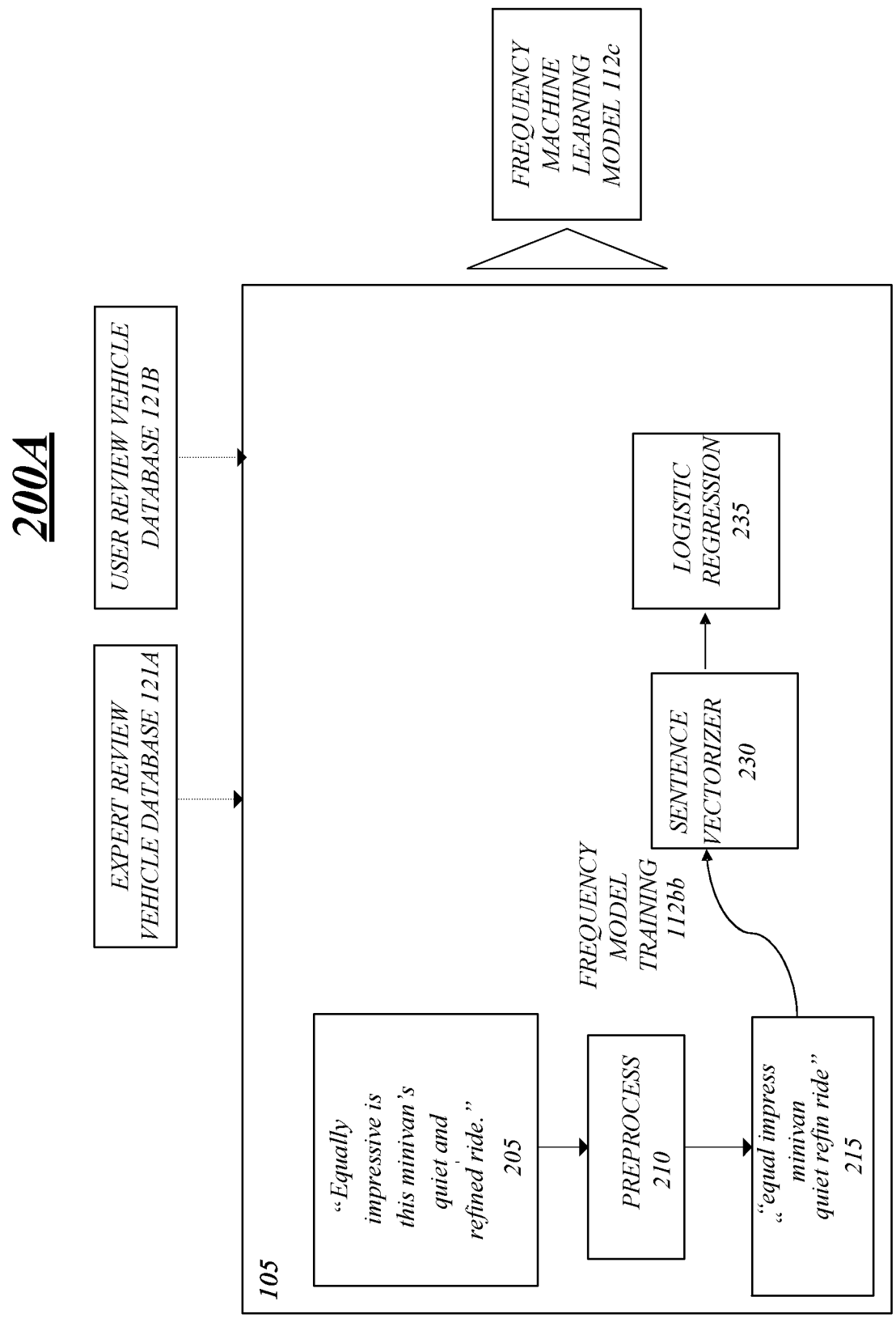
FIG. 2A illustrates an example of training a machine learning model and a system for providing vehicular information and useful for generating one or more tags according to at least one embodiment of the present disclosure.

By way of non-limiting example, in one or more embodiments, the machine learning models, as discussed further with respect to FIG. 2A, can determine a relationship between terms contained in expert or user reviews, e.g., "a vehicle that will make your friends jealous" to a particular automobile feature, e.g., "a V-6 engine" or a make and model associated with the term. The terms may be one or more tags 112b. In one embodiment, each tag 112b may map to one or more makes and/or models of automobile (e.g., a tag 112b for "good value" may map to one make of vehicle and 4 models of vehicle). In another embodiment, each tag 112b may have weights assigned to one or more makes and/or models (e.g., the "good value" tag 112b may have a weight of 0.66 for one make of vehicle and a weight of 0.34 for a specific model of vehicle, such that the weights sum to 1.0). For example, the tag extraction component 113 can utilize the determination of the machine learning model or models 112c to generate the one or more tags 112b. In embodiments where the machine learning model 112c is a TF-IDF model 112c, each tag can be associated with a probability distribution in relation to the TF-IDF model with respect to one more vehicle or automobile features, and the tag extraction component 113 can provide the tags corresponding to a highest probability that they are related to a particular automobile or vehicular suggestion entered by a user and/or can provide actual automobile or vehicular feature suggestions to the user, which can be all of the vehicle or automobile features associated with tag in rank order (e.g., based on probability). In one or more embodiments, the tag extraction component 113 can provide a tag associated with a highest probability and/or a highest probability automobile and/or vehicular feature associated with the highest probability tag itself.

In one or more embodiments, as the one or more models are trained, the one or models can determine that a particular expert or user review is referring to a particular vehicle feature or features based on previously processed data associated with other expert or user reviews in training database 121C (or in databases 121A and/or 121B if discrete segments of those databases are used for training), which can enhance the accuracy of the model, e.g., 112c, by adding additional training steps or layers (e.g., a neural network) based on the confirmation (and before receiving any user requests) and/or the training component 108 can be configured to skip fully processing an expert or user review when language associated with a specific automobile feature, e.g., language referring to a specific automobile feature, and the underlying relationship associated therewith, can be determined from an already processed expert or user review. In the latter case, computer resources are preserved, and the processing speed is increased by avoiding redundancies.

In one or more embodiments, the training component 108 configures the training of the machine learning models 112c to consider additional factors, independent of the training database 121C and/or the frequency of terms associated therewith. In one or more embodiments, the training component 108 can be configured to institute a feedback loop when training is completed for the machine learning models 112c, where, after being trained and being used for their intended purpose, the feedback loop enables the machine learning models 112c to consider user selection in generating a distribution of probabilities or a specific probability. In one or more embodiments, the machine learning model 112c can be configured to incorporate feedback from the training component 108, e.g., the output of a particular distribution of probabilities that a particular term can be altered based on actual user selection. For example, if the phrase "a vehicle that will make your friends jealous," and tag associated therewith, e.g., "jealous," is associated with one or more vehicles and a probability that the tag (and by extension the overall phrase) is associated with the one or more vehicles, where each vehicle is associated with a particular probability that a particular tag is associated therewith, actual user selection of one or more of the vehicles can adjust the overall distribution and the probability associated with the selected features for a subsequent query, e.g., when the one or more users 130 . . . 130N make a subsequent query. In one or more embodiments, the tag extraction component 113 can then update the probability distribution of features associated with one or more tags 112b, and by extension, the one or more tags 112b and/or one or more features associated therewith that are provided and displayed to the user.

In one or more embodiments, the training component 108 can train the machine learning model 112c and/or a different machine learning model in the same manner as with respect to the one or more tags 112b, except that the training can be based at least in part on aggregated web data 121D provided by the web-plug-in 132 for a plurality of different users. In one or more embodiments, once the training process has taken place with respect to the aggregated data provided by the web-plug-in 132, a score associated with the plurality of tags 112b can be updated based on the results from the training and/or applying the trained model to additional web traffic and/or web history data (e.g., the aggregated web data 121D). In one or more embodiments, any other suitable frequency-based approach or model can be used to generate a score with respect to the web-traffic associated with one or more users, such as a simplistic frequency-based approach that determines how many times a particular term, e.g. an actual reference to a particular make and model and/or feature associated therewith, is used, and then, as discussed with respect to FIG. 2C, the additional score can be used, with the information associated with the plurality of tags 112b, to generate a determination for a particular vehicular or automobile preference of a user.

Any variation of the above features or other suitable features, including features as discussed with reference to the description of one or more embodiments for the one or more databases 120, can be used as feedback or input features for the machine learning models 112c during training and/or incorporated into the protocol for providing an output to distribution to the one or more users 130 . . . 130N.

The trained machine learning models 112c can be stored in storage 110 and utilized by one or more components of the vehicle suggestion unit 103, including but not limited to the processor 102 and the tag extraction component 113, and/or any other suitable component, unit or system as disclosed herein, to generate the one or more tags 112b, where the one or more tags can be utilized to provide a specific vehicular or automobile suggestion, including a particular make and model of a vehicle.

In one or more embodiments, the ingested texts from training database 121C (e.g., the expert review vehicle database 121A, aggregated web data 121D, and/or the user review vehicle database 121B, and/or the vehicle databases 121N) can be pre-processed by the pre-processing component 107 before being used by the training component 108 to train the models, e.g., removing some or all of verbs, pronouns, and stop words from ingested sentences, removing sentences that are irrelevant, e.g., having nothing to do with vehicles (such as a copyright statement in an article review). In one or more embodiments, the pre-processing is valuable at least because training any model with condensed and relevant material increases processing speed and training accuracy. Moreover, pre-processing can result in a single term being extracted from a phrase and associated with a particular probability that a phrase relates to a specific automobile or vehicular feature, which in turn can constitute a tag that can be used as described herein.

The pre-processing component 107 can also be used by the tag extraction component 113 in order to reduce a phrase to a single word before or after applying the machine learning model 112c to a dataset to extract one or more tags, (wherein one or more embodiments the machine learning model 112c could have been trained with or without pre-processing terms from the relevant datasets, e.g., 121C), wherein one or more embodiments, the pre-processing component 107 is a post-processing component, e.g., processing occurs after training of a model and its after its application to a particular phrase, term or bigram from databases 121A and/or 121B. For example, during training the training component 108 can ingest a phrase, e.g., "Model X made by manufacturer Y is a family-friendly vehicle," as part of training a word-frequency model, and a particular probability that Model X made by manufacturer Y is associated with the phrase "is a family-friendly vehicle" can be determined using word-frequency techniques and without pre-processing the phrase down to a single word. Once the model is applied to another dataset or to portions of a dataset not utilized during training, e.g., databases 121A and 121B, the tag extraction component 113 can coordinate with the pre-processing component 107 to process the term "is a family-friendly vehicle" to a single word, bigram, or word combination, e.g., "family-friendly" after applying the model to the datasets (or before application to the datasets 121A and/or 121B, but after training), such that the processed term, e.g., "family-friendly," constitutes a tag. In one or more embodiments, a phrase, sentence, or entire passage, without processing before or after training is completed, can be a tag part of the one or more tags 112b.

In one or more embodiments, the tag extraction component 113 can consolidate one or more tags of the tags 112b that meet a certain probability threshold (or another suitable threshold), in relation to a particular vehicular automobile or automobile feature, e.g., a particular make and model, into a single document. In one or more embodiments, more than one document can be prepared, where each document corresponds to a distinct automobile or vehicular features and forming a generated document set 112a, where the generated document set 112a can be an aggregated document set 112a.

In one or more embodiments, this can enhance the efficiency of the system 100 when providing tags and/or an automobile suggestion to a user (e.g., in response to a user query) as all related tags are located in a single document and can be extracted without expending unnecessary computer resources. In one or more embodiments, the aggregation of related tags into a single document can occur prior to or after processing a phrase down to a single term or bigram.

Embodiments are not limited in the above manner, and the above system is merely an exemplary embodiment for implementing one or more features of the present disclosure.

FIG. 2A illustrates one or more embodiments 200A for training and/or utilizing a machine learning model according to the present disclosure and for extracting one or more tags from one or more data sources. In one or more embodiments of FIG. 2A, one or more components of FIG. 1 are included. Any suitable component of the vehicular machine learning training component 105

The vehicular machine learning training component 105 can, during training, train the model, e.g., 112c, to make a prediction on where in the corpus of expert reviews from the expert review vehicle database 121A (and/or the user review vehicle database 121B) a particular sentence is located, e.g., vehicle prediction and/or to link or associate specific language to language in the databases 121A and 121B.

In one or more embodiments, the vehicular machine learning training component 105 may receive an input 205 from the one or more databases 120, e.g., the training dataset 120C. The vehicular machine learning training component 105 can preprocess 210 the text before training the model 112c. For example, if the training dataset 120C includes an expert review from the expert review vehicle database 121A, which states "equally impressive is this minivan's quiet and refined ride," then the vehicular machine learning training component 105 can remove all verbs, conjunctions, extraneous words, and reduce all inputs to root words, such that whatever machine learning configuration is applied, the input may be "equal impress quiet refine ride" 215. In one or more embodiments where preprocessing is applied, computational resources can be reserved when training a model and/or when reusing it.

In one or more embodiments, a word frequency model training 112b b occurs, and employs a sentence vectorizer 230, e.g., a term frequency, to an entire database, e.g., the training database 121C, to determine a relationship between a particular vehicle feature, e.g., make and model, to a particular word, term, bigram, phrase, or sentence. (As discussed above, the data can be pre-processed prior to vectorizing it). For example, in the case where TF-IDF is used, the number of times a term or word, e.g., "jealous" or bigram, e.g., "very jealous," or a phrase, e.g., "this minivan is quiet and refined", is used in the one or more of collection of expert or user reviews in database 121C, which can also be in one or more databases 121A and/or 121B for a particular vehicle, e.g., make/model (or a collection of reviews for other specific functional, mechanical, or aesthetic features of a vehicle), offset by a factor, e.g., the total number of expert reviews in database 121C (and/or 121A and/or user reviews in database 121B), results in an associated mathematical representation of that frequency.

In one or more embodiments, the output of the sentence vectorizer 230 is fed into a classifier, normalizer, or any other suitable model or technique, e.g., a logistic regression scheme/model 235 to train the model 112c. In one or more embodiments, when the regression scheme/model and/or the models 235 is otherwise a TF-IDF model, a lower overall-frequency within the database 121C in relation to all of the vehicular or automotive features, e.g., a term does not reference all of or more of the makes and models described in database 121C, receives a higher score with respect to a particular vehicular or automotive feature, e.g., a particular make and model, when it is used in association at a higher-frequency than other terms or phrases in relation to that particular make and model. A tag extraction component 113, once the trained model 235 is developed, e.g., model 112c, can apply a threshold based on the scores or probabilistic distribution generated by the model and as applied to another dataset, to determine that one or tags meeting or exceeding the threshold are related to one or more tags, where those tags can be aggregated into one or more documents, each document corresponding to a particular make and model. Since the language in expert or user reviews may be similar to language used by a user when describing or requesting a vehicle, and by extension similar to the one or more tags, a high probability that a particular tag corresponds to a particular vehicular or automotive feature, e.g., a particular make and model, is likely to also mean that the particular vehicular or automotive feature corresponds to a request of a user associated with the language.

In one or more embodiments, as stated and implied herein, the training with respect to FIG. 2A can also be applied to aggregated web data provided by a web-plug-in and can become part of an aggregated machine learning model and/or a separate machine learning model, where an ultimate scored output of either the single or dual machine learning model is adjusted based on the application of the machine learning model trained with aggregated web-data to additional web-data. Alternatively, in one or more embodiments, the trained model based on the automobile or vehicular reviews can be applied to the aggregated web-data 121D to generate an output useful in one or more embodiments as discussed herein. For example, the web-plug-in 132 may provide a user's browsing and/or search history as the aggregated web data 121D to the trained model 112c, and the trained model 112c may return one or more recommended vehicles (and/or vehicle types) to the user, e.g., in a popup or other type of graphical user interface. Still alternatively, in one or more embodiments, a different frequency approach can be applied to the web-data, and a combined output that factors tags generated from the model 112c (as discussed with respect to FIG. 2B) and a frequency score or weight using a different approach than inverse-term-frequency, e.g. term-frequency, can be used to generate a user recommendation and/or determine a user preference with respect to a vehicular or automobile feature.

Figure 2B:
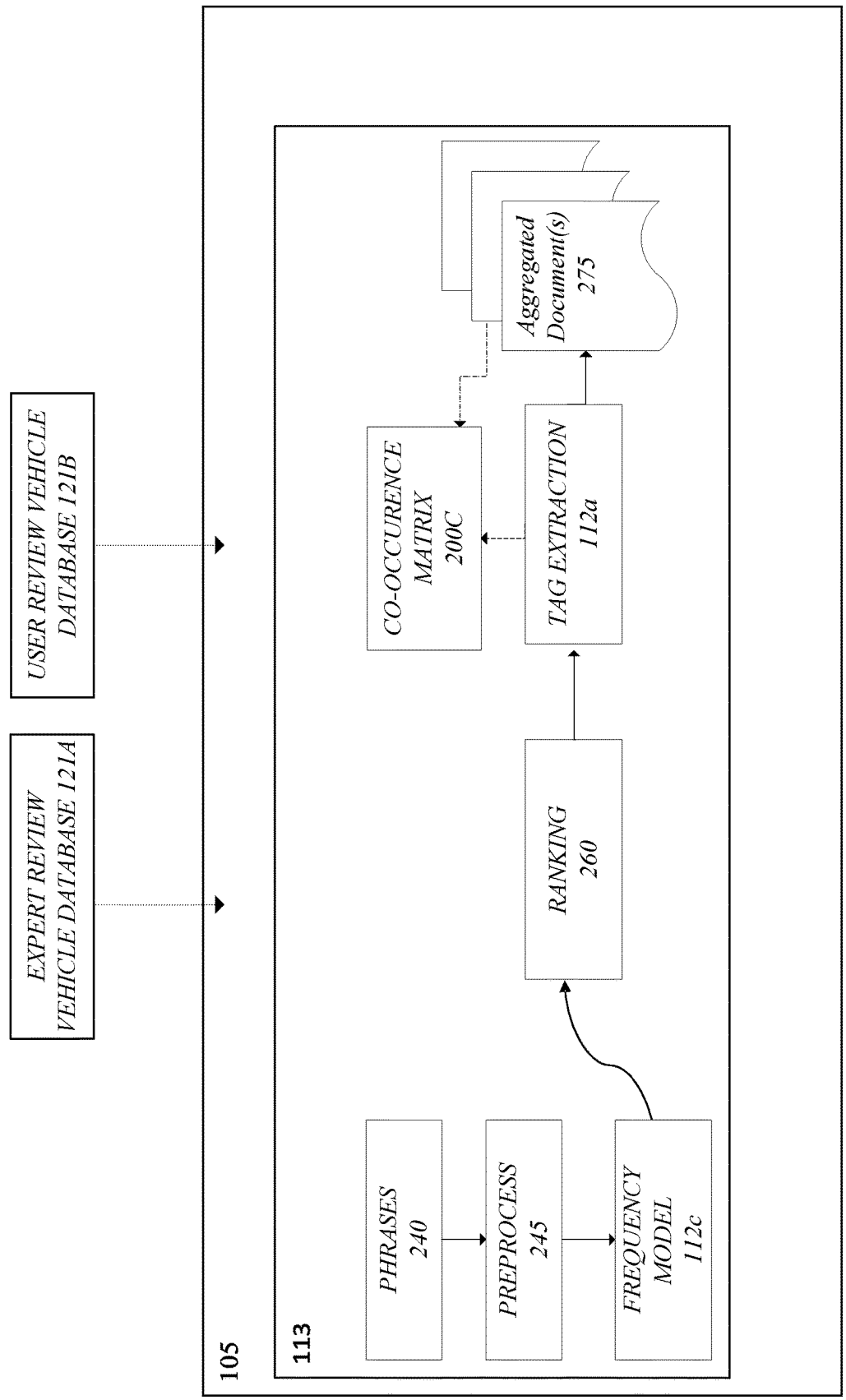
FIG. 2B illustrates an example for providing vehicular information, including generating one or more tags, according to at least one embodiment of the present disclosure.

FIG. 2B illustrates one or more embodiments for a configuration 200B using at least one component of system 100 and machine learning models 112c to generate one or more tags useful for providing a vehicular suggestion to a user. In one or more embodiments, a tag extraction component 113 ingests data from one or more databases 121, e.g., expert review vehicle database 121A and/or user review vehicle database 121B. The data can be one or more phrases 240 contained in databases 121A and/or 121B. In one or more embodiments, prior to applying the frequency model 112c, which can be a TD-IDF model, the one or more phrases can be pre-processed 245 to reduce the terms to a single term, where the pre-processing can be performed by the pre-processing component 107 as outlined herein. In one or more embodiments the pre-processing is omitted or performed at some later stage after the frequency model 112c is applied to the one or more phrases, e.g., the phrases are aggregated in one or more aggregated documents 275, where each aggregated document corresponds to one or more distinct vehicular features (as discussed in further detail below). In one or more embodiments, the expert review vehicle database 121A and/or the user review vehicle database 121B can be a database related only to one type of make and model, and the tags associated therewith can be related to that particular make and model, which can increase the accuracy that the higher probability tags correspond to that particular make and model (or other specific automotive or vehicular feature) as a large amount of data is dedicated to a particular make and model and the terms most likely to correspond to it can be more accurately determined in this context as a result. In various other embodiments, the expert review vehicle database 121A and/or the user review vehicle database 121B can contain reviews for more than one type of make and model (or other particular automotive or vehicular feature).

In one or more embodiments, the frequency model 112c is applied to data from expert review vehicle database 121A and/or user review vehicle database 121B, where the data includes one or more expert and/or user reviews, and in one or more embodiments, the data used to train the model 112c contained expert and/or user reviews of the same type as, e.g., from training database 121C, but the data ingested from expert review vehicle database 121A and/or user review vehicle database 121B is distinct.

In one or more embodiments, once the machine model 112c, e.g., a TF-IDF model, is applied to the data from the expert review vehicle database 121A and/or the user review vehicle database 121B, the tag extraction component 113 can perform a ranking operation 260 to the single terms (if pre-processing occurred) or phrases (if pre-processing did not occur) based on the probabilities associated with the output of the TF-IDF model 112c. The ranking operation 260 can rank whether a particular vehicular or automotive feature, e.g., make and model, corresponds to a single term or phrase. Each single term or phrase that exceeds a threshold, with respect to any one or more particular automotive or vehicular feature, e.g., such a one or more make and models, based on a probability distribution associated with the TF-IDF model 112c is then extracted as a tag by the tag extraction component 113. In one or more embodiments, if pre-processing or another kind of textual processing has not occurred to reduce a phrase to a single term, the processing can occur at this stage. Each tag meeting or exceeding a probability threshold with respect to a particular vehicle or automotive feature is ascribed to a document associated with the particular vehicular or automotive feature, e.g., a make and model, in the aggregated or generated documents 112a. In one or more embodiments, within the particular document associated with a particular make and model, the individual tags can be ranked based on the probability distribution associated with the application of the model 112c to the database 121A and/or 121B; and as such, in one or more embodiments, one or more tags 112b may be present on more than one document of the aggregated documents 112a. In one or more embodiments, a particular vehicular or automotive feature associated with one or more tags 112b can be a general class corresponding to a set of vehicle or automotive features, e.g., a particular make and model with different years, and a single document can contain different features corresponding to that class, e.g., the same make and model but across different years.

Figure 2C:
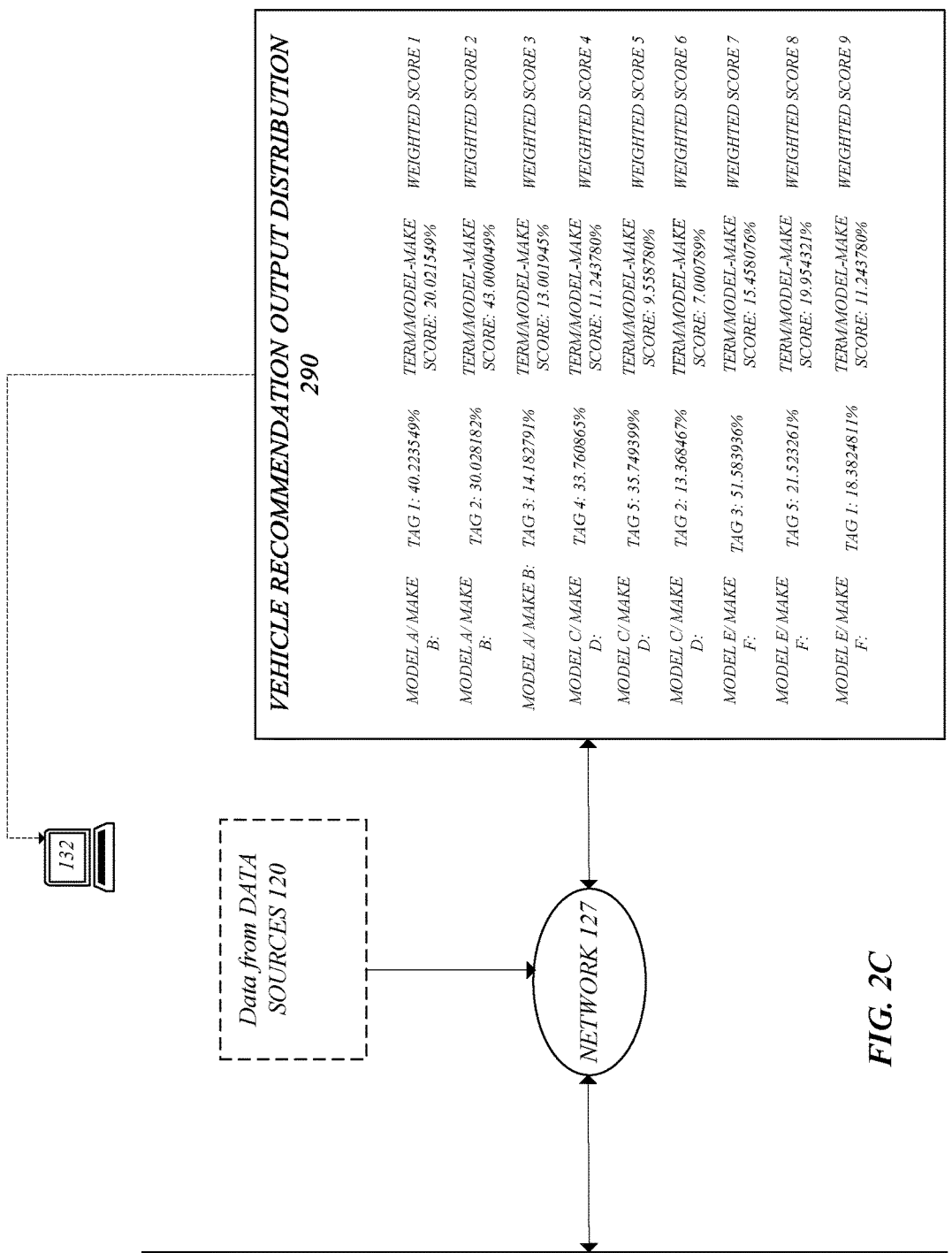
FIG. 2C illustrates an example for providing vehicular information, including using one or more tags, according to at least one embodiment of the present disclosure.

FIG. 2C illustrates one or more embodiments for a configuration 200C using at least one component of system 100, the configuration 200B, and/or other frequency-based techniques. As shown, system 100 and the vehicle suggestion unit 103 associated therewith are condensed/modified, but system 100 and vehicle suggestion unit 103 can include all of the elements as described in FIG. 1. Although the configuration 200C shows using system 100 and portions of vehicle suggestion unit 103 in particular, any computer system configured to perform one or more operations as discussed herein, and with the appropriate software or hardware component, modules, and/or units can be suitably used. In one or more embodiments, since generated documents 112a, the generated tags 112b, and/or machine learning model 112c can be stored in storage, e.g., 110 as shown in FIG. 1, generated documents 112a, the generated tags 112b, and/or machine learning model 112c can be transferred, accessed, and/or used by another system. In one or more embodiments, the configuration 200C can communicate, configure, and/or be part of a web-plug-in 132 configurable on device 131. In one or more embodiments, the aggregated web data 121D is stored locally on each individual user device, e.g. 131, and the generated tags 112b are part of a system, e.g. vehicle suggestion unit 103, that is part of a host system, e.g. server.

In one or more embodiments, a user can provide a search string input to vehicle suggestion unit 103 (e.g., via a network 127, but alternatively, directly or as otherwise suitable) with respect to a vehicle search, such as a car. For example, the user may provide input specifying "I want a minivan that's quiet and refined." The web-plug-in 132 may record the search string and provide the search string to the tag extraction component 113. The tag extraction component 113 can provide an output for one or more tags in relation to one or more particular vehicle features, e.g., particular makes and models. In one or more embodiments, the tag extraction component 113 can operate as a filter that coordinates with the NLP component 106 to exactly match one or more tags or determine synonyms corresponding to one or more generated tags in relation to the input, where the synonym can be processed to correspond to an existing generated tag, or in the event that it is a synonym to more than one tag, all of the tags for which it is a synonym.

In one or more embodiments, the web-plug-in 132 can determine, e.g. based on a threshold of web-traffic reviewed by users, that a suggestion, e.g. recommending a particular vehicle or providing a particular tag, would be helpful to users in making a vehicular or automobile selection. Furthermore, based on tracking the web pages visited and/or the search queries submitted by the users (e.g., the aggregated web data 121D), the web-plug-in 132 provides metrics (e.g., web traffic, submitted search queries) to the host server system (e.g., the vehicle suggestion unit 103 and/or any component described herein) by which one or more vehicle recommendations may be determined. Doing so may allow the host server system to provide an updated user interface that includes the relevant recommendations. Furthermore, in various embodiments, the suggestion or recommendation is based on output 290. The suggestion and/or recommendation may be outputted for display on the client device 131.

The output 290 can be a probability distribution corresponding to one or more tags in relation to one or more makes and models, or the output 290 can be the makes and models with each corresponding tag or tags, or the output 290 can be the tags, or the output 290 can be a tag and/or make and model corresponding to the tag with the higher probability in relation to the user input. In one or more embodiments, a single make and model in relation to one or more tags, e.g., Model A Make B, can be displayed, and in one or more embodiments where the phrase corresponds to more than one tag, multiple tags corresponding to multiple makes and models can be displayed, e.g., as shown, Model A Make B, Model C Make D, and Model E Make F. As stated, the probability distribution may be based on the monitored web history and/or search history of a user by the web-plug-in 132.

In one or more embodiments, where the tags by themselves are provided as an output after the tag extraction component 113 filters the tags based on the one or more tags 112b (as may be contained in one or more generated documents 112a, each corresponding to a particular make and model), the user 130 may select via a suitable input/output interface on device 131 one or more tags 112b as being of interest. The tag extraction component 113 can provide a first suggestion based on the make and models with the highest probability correlation in relation to the one or more tags 112b, and then the tag extraction component 113 can supply additional suggestions, e.g., second and third, based on the next higher probability thresholds with respect to other makes and models and/or by utilizing relationships in a suitable co-occurrence matrix and/or as otherwise disclosed herein. Accordingly, the tag extraction component 113 can utilize the one or more tags 112b as one or user-interface filters.

In one or more embodiments, output 290 can be based not just on the plurality of tags 112b and scores and percentages in relation to vehicular features in association therewith, but additionally, on a score or factor associated that accounts for web-traffic of a user tracked by the web-plug-in 132. As shown, a particular make and model, e.g. Model A/Make B, can have a particular percentage association with respect to a tag, e.g. Tag 1. A second score or weight, labeled "TERM/Model-Make" that accounts for a frequency technique applied to the aggregated web-data can also be associated with that make and model, e.g. applying the trained model 112c to the aggregated web-data 121D of a user monitored by the web-plug-in 132, applying a second inverse-frequency model to the aggregated web-data reviewed by a user, and/or applying a standard frequency based model to the aggregated web-data reviewed by a user (e.g. simply counting the number of times a particular make and model is referenced in the aggregated web data and/or simply counting the number of times a particular term associated with a make and model is referenced in the aggregated web data).

In one or more embodiments, the first score or weight and the second score and weight of output 290 can be mathematically combined using any suitable technique, including any suitable concatenation or averaging technique, to generate a final weighted-score, which can then form the basis for the actual recommendation or suggestion provided to the user. In one or more embodiments, the configuration 200C is such that the actual score associated with each individual tag is updated based on the application of the frequency technique (e.g. whichever suitable technique is used) to the aggregated web data. In one or more embodiments, a minimal threshold must be met with one or both of the scores before the other score is considered or incorporated into the output distribution, e.g. if the score associated with the tags, which is based on the user reviews, does not exceed a certain threshold, then the score based on the web-traffic is not factored into the output with respect to a particular tag and/or make or model (and vice versa).

Figure 3:
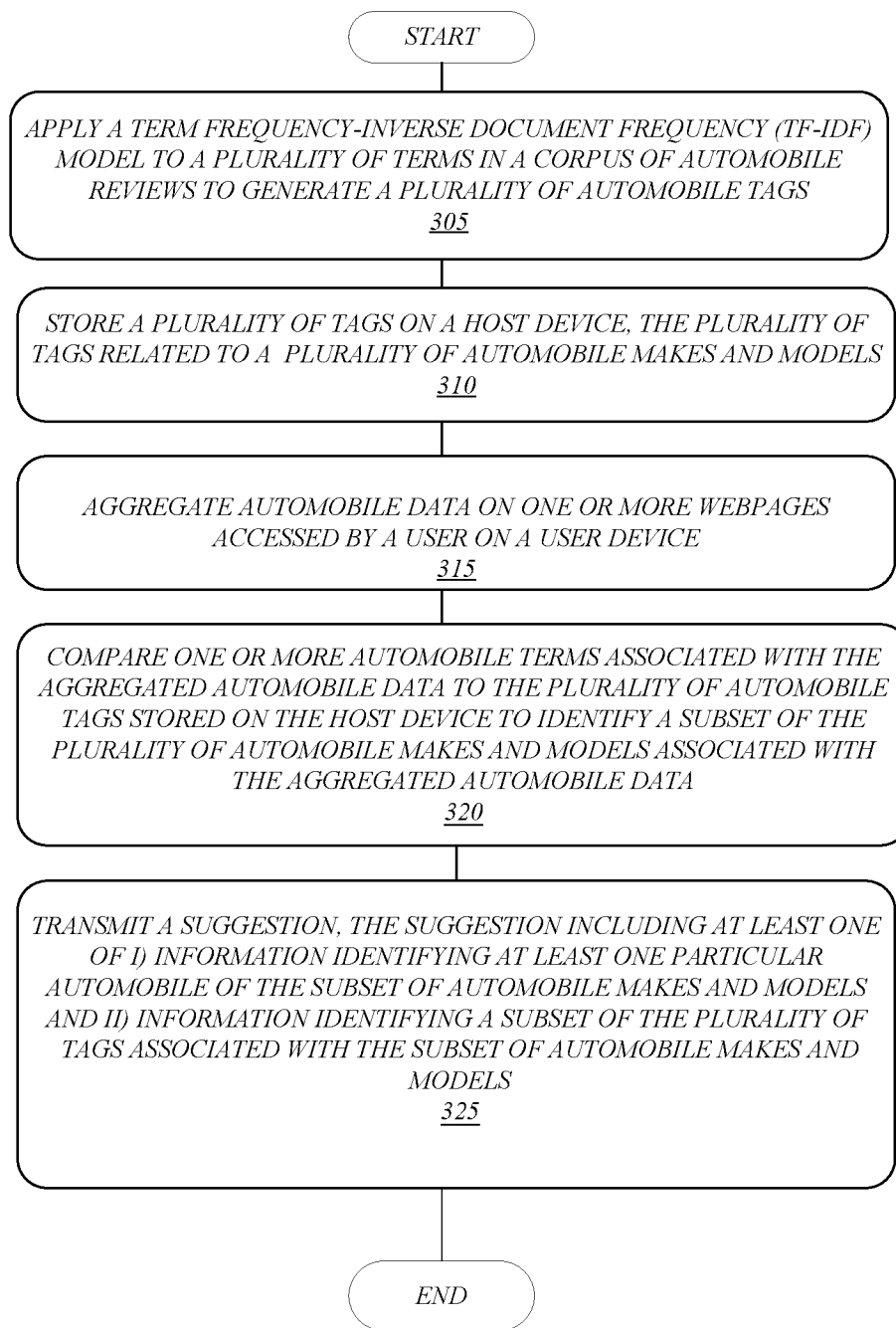
FIG. 3 illustrate examples of one or more processing flows for providing a vehicular recommendation according to at least one embodiment of the present disclosure.

FIG. 3 illustrates an example of a logic flow 300 that may be representative of some or all of the operations executed by one or more embodiments described herein. For example, the logic flow 300A may illustrate operations performed by a vehicular suggestion system to provide a specific recommendation or suggestion for a vehicular feature or automobile to a user.

At block 305, one or more embodiments include generating one or more tags. The generation of the tags can occur by applying a machine learning model (MLM), e.g., a TF-IDF model, to one or more review databases that review automotive and vehicular features. In one or more embodiments, the review databases can include either one or both of a corpus of reviews that references two or more of the vehicular or automotive features (e.g., more than one type of make and model and/or one type of automobile) or a corpus of reviews that references only one type of vehicular or automotive feature (e.g., one type of make and model and/or one type of automobile) of the plurality of automobiles.

The one or more tags can be generated by aggregating all terms or phrases in the one or more user and/or expert review vehicle databases that meet a threshold computation associated with the applied machine learning model. The threshold computation can be based on a probability distribution associated with an output of the machine learning model, and each phrase or term can be ascribed with a particular probability that it corresponds to a specific vehicular or automotive feature, e.g., a specific make and model. In relation to the specific vehicular or automotive feature, the terms or phrases can be ranked, and based on the ranking, tags meeting a certain threshold can qualify as tags being associated with a particular vehicular or automotive feature. In one or more embodiments, each specific vehicular or automotive feature can be associated with its document, and all the tags associated with that specific vehicular or automotive feature can be consolidated into that document, which can make extraction and use at a subsequent time more efficient and effective.

The machine learning model can be trained by processing data from one or more vehicle databases, where the databases can include pricing information for vehicles, functional attributes for vehicles, location of specific vehicles and the general availability of specific vehicles in certain areas, and expert reviews that use language to describe specific vehicle features, including particular makes and models. In one or more embodiments, the vehicles are cars, and the information contained in one or more databases are associated with cars. Based on the training determined by the data in the one or more databases, the MLM can be trained to associate one or more specific automobile types in relation to automobile language, as the data used to train the database can contain language similar to what a user, e.g., consumer, would use in describing a vehicle, where the language was associated with a specific vehicle type. Once the MLM is trained, it can be applied to another dataset of reviews, and one or more tags can be generated therefrom.

In one example, the machine learning model can be a word frequency model that was trained to associate the frequency of a particular make and model (or makes and models) in association with phrases or words contained in one or more user or expert reviews contained in the database.

In one or more embodiments, at block 310, the plurality of tags can be stored on a host device such that they can be used as part of an overall vehicular or automobile suggestion or recommendation to a user. In one or more embodiments, at block 315, web-traffic or web-data associated with material reviewed by a user on his or her user device is aggregated, e.g. by a web-plug-in 132 executing on the user device, for at least one analysis purpose. In one or more embodiments, the web-plug-in 132 aggregates web data until the user stops submitting search queries and/or reviewing web-pages or other material associated with vehicular or automotive information, e.g. a time threshold is exceeded, and/or until a sufficient volume of information is reviewed, e.g. the web-plug-in 132 performs a threshold analysis to determine when a sufficient amount of web search and history data has been aggregated. In one or more embodiments, the aggregated web-data 121D and/or the plurality of tags (and by extension the reviews associated therewith) are related to automobiles.

At block 320, one or more embodiments can include making a comparison of one or more automobile terms associated with the aggregated automobile data to the plurality of tags stored on the host device in order to identify a subset of the plurality of automobile makes and models associated with the aggregated automobile data that can be useful to the user, e.g. a suitable recommendation or suggestion for the user. In one or more embodiments, the comparison can involve combining a score and/or weight associated with the plurality of tags, e.g. based on the frequency model associated with generating the plurality of tags from the one or more user reviews, with a score and/or weight based on a frequency feature of terms in the aggregated web-data, e.g. a score and/or weight based on the frequency that a particular automobile make and model (or term associated therewith) is referenced in the aggregated web-data. Any suitable mathematical operation, in addition to thresholding operations (as described herein), such as requiring a certain threshold score and/or weight for one of the two scores and/or weights before combining them (and by extension considering the combination as a suitable output option for a user suggestion or recommendation) to generate a final score and/or weight, can be used to generate the combined score and/or weight.

In one or more embodiments, the comparison can be responsive to receiving a vehicle or automobile search string from a user, including language with respect to a preferred automobile characteristic or feature, e.g., "a spacious van," "a car to make everyone jealous," "a car with oomph," etc. The search string may be recorded by the web-plug-in 132. The vehicular suggestion system can utilize this request to assist the user in making a decision, e.g., selecting a particular car. The user request can be received by the system via a chatbot dialog communicating with the user, where the chatbot asks the user questions, e.g., "what car are you interested in," and the user indicates a general preference feature, e.g., "I want a car with a sweet ride." Alternatively, in one or more embodiments, the request can be made by the user inputting the request in a single search field of a query system, such as a search engine or a search box associated with a website, or through multiple search fields of the same.

As another example, the web-plug-in 132 may monitor the web pages visited by the user and the search queries submitted by the user. For example, the user may search for "sporty" cars using one or more search engines. Doing so may cause the user to browse one or more web pages in the search results related to sporty vehicles. The web-plug-in 132, logging the search queries and the visited web pages as web data 121D, may provide the aggregated web data 121D to the model 112c. Doing so may cause the model 112c to return one or more suggested sporty vehicles to the user, e.g., via a popup window.

At block 325, one or more embodiments can include the transmission and generation of a recommendation or suggestion to a user via the web-plug-in 132, where the suggestion or recommendation can include at least one of i) information identifying at least one particular automobile of the subset of automobile makes and models or ii) information identifying a subset of the plurality of tags associated with the subset of automobile makes and models. The generated and transmitted recommendation or suggestion can be based on an output resulting from the comparison operations of block 320. For example, the model 112c may return a specific make/model that is returned in the output distribution 290. As another example, the model 112c may return several makes/models of sporty cars as the output distribution 290. The web-plug-in 132 may then return the suggestions to the user.

In one or more embodiments, the suggestion or recommendation can be for at least one specific vehicle or automobile feature and by utilizing the one or more tags. In one or more embodiments, the recommendation can be providing one or more tags themselves without specific vehicle or automotive features, and instructing the user to utilize them in performing a search for a vehicular or automotive feature by using the one or more tags in relation to a database containing vehicular or automotive information, providing the one or more tags in relation to one or more automotive or vehicular features, and/or providing only the one or more automotive or vehicular feature, e.g., makes and models, associated with the one or more tags. The specific vehicle feature can be any specific mechanical, aesthetic, or functional feature associated with a vehicle. In one embodiment, the one or more tags are each associated with at least one specific car make and model, and in one embodiment the recommendation is a specific distribution or ranking of multiple car makes and models. Since, in one or more embodiments, the one or more tags are generated by associating language with respect to one or more specific vehicle features, e.g., make and model, in the expert or use review databases, the recommended vehicle feature can be a vehicle feature referenced in the one or more user or expert reviews.

Figure 4:
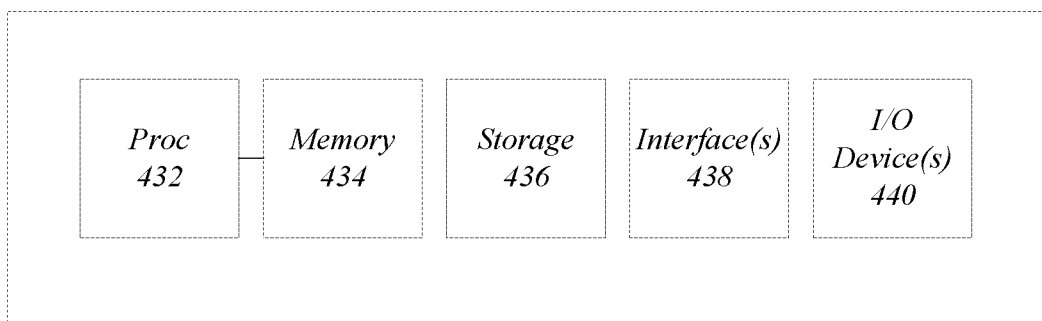
FIG. 4 illustrates a machine learning system according to an embodiment of the present disclosure

FIG. 4 illustrates an example of a vehicular suggestion system 406. The vehicular suggestion system 406 includes one or more processor(s) 432, memory 434, storage 436, one or more interface(s) 438, and one or more I/O device(s) 440.

In embodiments, the vehicular suggestion system 406 may be a processing system that includes one or more servers or computing devices that are interconnected via one or more network links, e.g., wired, wireless, fiber, etc. In some instances, the transaction services system may be a distributed computing system. Each of the servers may include one or more processor(s) 432, which may include one or more processing cores to process information and data. Moreover, the one or more processors 432 can include one or more processing devices, such as a microprocessor manufactured by Intel™, AMD™, or any of various processors. The disclosed embodiments are not limited to any type of processor(s).

Memory 434 can include one or more memory (volatile or non-volatile) devices configured to store instructions used by the one or more processors 432 to perform one or more operations consistent with the disclosed embodiments. For example, memory 434 can be configured with one or more software instructions, such as programs that can perform one or more operations when executed by the one or more processors 432.

The disclosed embodiments are not limited to separate programs or computers configured to perform dedicated tasks. For example, memory 434 can include a single program that performs the operations or could comprise multiple programs. Memory 434 can also store data that can reflect any type of information in any format that the system can use to perform operations consistent with the disclosed embodiments.

In embodiments, the vehicular suggestion system 406 may include one or more storage devices 436. The storage devices 436 may include HDDs, flash memory devices, optical storage devices, floppy storage devices, etc. In some instances, the storage devices 436 may include cloud-based storage devices that may be accessed via a network interface. In some embodiments, the storage 436 may be configured to store one or more databases and/or as a distributed database system to store information and data. Databases can include one or more memory devices that store information and are accessed and/or managed through the vehicular suggestion system 406. By way of example, databases can include Oracle™ databases, Sybase™ databases, or other relational databases or non-relational databases, such as Hadoop sequence files, HBase, or Cassandra. The databases or other files can include, for example, data and information related to the source and destination of a network request, the data contained in the request, transaction information, etc. Systems and methods of disclosed embodiments, however, are not limited to separate databases. In one aspect, vehicular suggestion system 406 can include databases located remotely from other vehicular suggestion system 406 devices. The databases can include computing components (e.g., database management system, database server, etc.) configured to receive and process requests for data stored in memory devices of databases and to provide data from databases.

Figure 5:
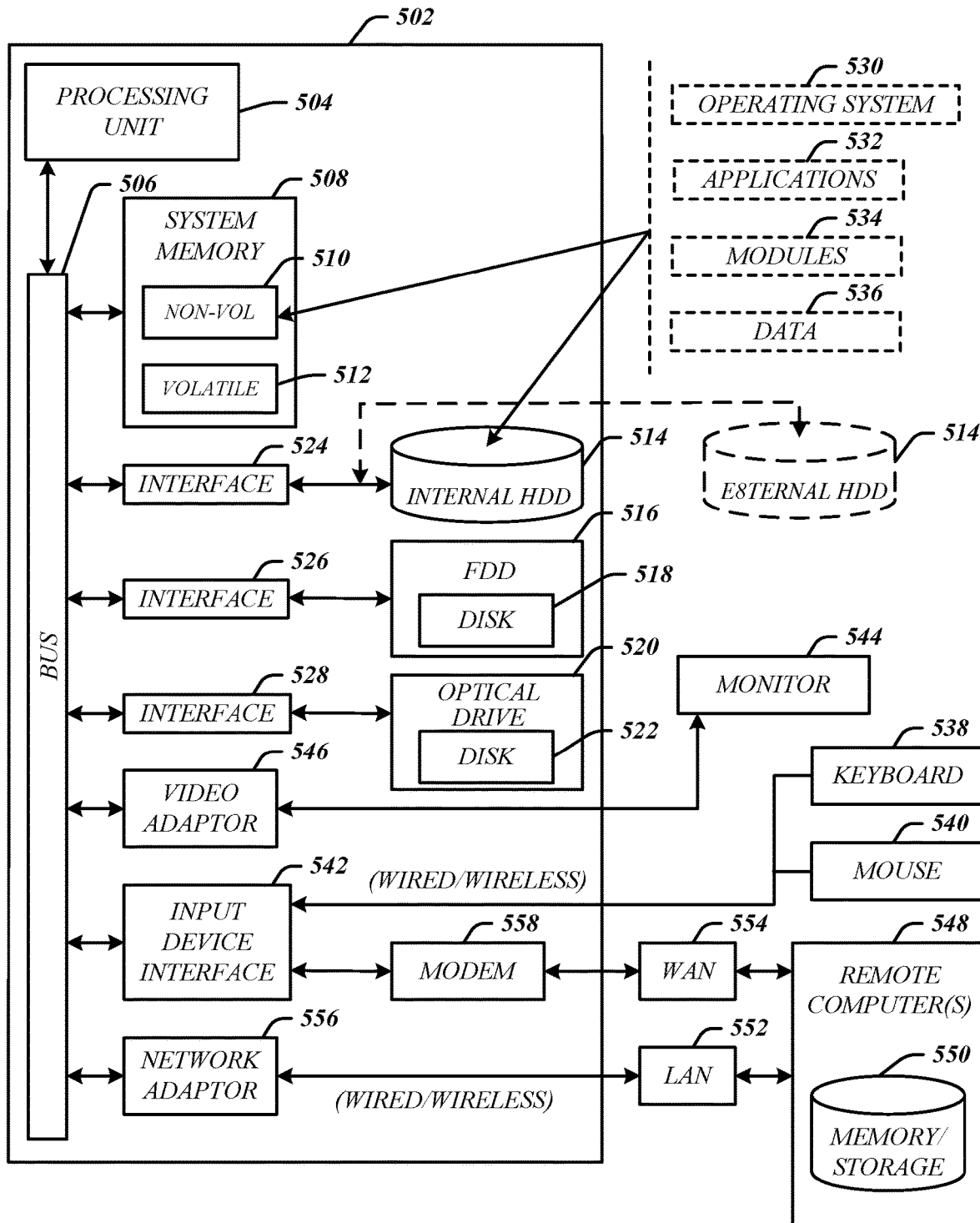
FIG. 5 illustrates an embodiment of a computing architecture useful with at least one embodiment of the present disclosure.

FIG. 5 illustrates an embodiment of an exemplary computing architecture 500 suitable for implementing one or more embodiments as previously described. In one embodiment, the computing architecture 500 may include or be implemented as part of system 100.

As used in this application, the terms "system" and "component" are intended to refer to a computer-related entity, either hardware, a combination of hardware and software, software, or software in execution, examples of which are provided by the exemplary computing architecture 500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 500.

As shown in FIG. 5, the computing architecture 500 includes a processing unit 504, a system memory 506 and a system bus 508. The processing unit 504 can be any of various commercially available processors.

The system bus 508 provides an interface for system components including, but not limited to, the system memory 506 to the processing unit 504. The system bus 508 can be any of several types of bus structure that may further interconnect to a memory bus (with or without a memory controller), a peripheral bus, and a local bus using any of a variety of commercially available bus architectures. Interface adapters may connect to the system bus 508 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 500 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 5, the system memory 506 can include non-volatile memory 510 and/or volatile memory 512. A basic input/output system (BIOS) can be stored in the non-volatile memory 510.

The computer 502 may include various types of computer-readable storage media in the form of one or more lower speed memory units, including an internal (or external) hard disk drive (HDD) 514, a magnetic floppy disk drive (FDD) 516 to read from or write to a removable magnetic disk 518, and an optical disk drive 520 to read from or write to a removable optical disk 522 (e.g., a CD-ROM or DVD). The HDD 514, FDD 516 and optical disk drive 520 can be connected to the system bus 508 by an HDD interface 524, an FDD interface 526 and an optical drive interface 528, respectively. The HDD interface 524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 510, 512, including an operating system 530, one or more application programs 532, other program modules 534, and program data 536. In one embodiment, the one or more application programs 532, other program modules 534, and program data 536 can include, for example, the various applications and/or components of the system 600.

A user can enter commands and information into the computer 502 through one or more wire/wireless input devices, for example, a keyboard 538 and a pointing device, such as a mouse 540. Other input devices may include microphones, infra-red (IR) remote controls, radio-frequency (RF) remote controls, gamepads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 504 through an input device interface 542 that is coupled to the system bus 508 but can be connected by other interfaces such as a parallel port, IEEE 1394 serial port, a game port, a USB port, an IR interface, and so forth.

A monitor 544 or other type of display device is also connected to the system bus 508 via an interface, such as a video adaptor 546. The monitor 544 may be internal or external to the computer 502. In addition to the monitor 544, a computer typically includes other peripheral output devices, such as speakers, printers, and so forth.

The computer 502 may operate in a networked environment using logical connections via wire and/or wireless communications to one or more remote computers, such as a remote computer 548. The remote computer 548 can be a workstation, a server computer, a router, a personal computer, portable computer, microprocessor-based entertainment appliance, a peer device or other common network node, and typically includes many or all the elements described relative to the computer 502, although, for purposes of brevity, only a memory/storage device 550 is illustrated. The logical connections depicted include wire/wireless connectivity to a local area network (LAN) 552 and/or larger networks, for example, a wide area network (WAN) 554. Such LAN and WAN networking environments are commonplace in offices and companies, and facilitate enterprise-wide computer networks, such as intranets, all of which may connect to a global communications network, for example, the Internet.

When used in a LAN networking environment, the computer 502 is connected to the LAN 552 through a wire and/or wireless communication network interface or adaptor 556. The adaptor 556 can facilitate wire and/or wireless communications to the LAN 552, which may also include a wireless access point disposed thereon for communicating with the wireless functionality of the adaptor 556.

When used in a WAN networking environment, the computer 502 can include a modem 558, or is connected to a communications server on the WAN 554 or has other means for establishing communications over the WAN 554, such as by way of the Internet. The modem 558, which can be internal or external and a wire and/or wireless device, connects to the system bus 508 via the input device interface 542. In a networked environment, program modules depicted relative to the computer 502, or portions thereof, can be stored in the remote memory/storage device 550. It will be appreciated that the network connections shown are exemplary and other means of establishing a communications link between the computers can be used.

The computer 502 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-5 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 6:
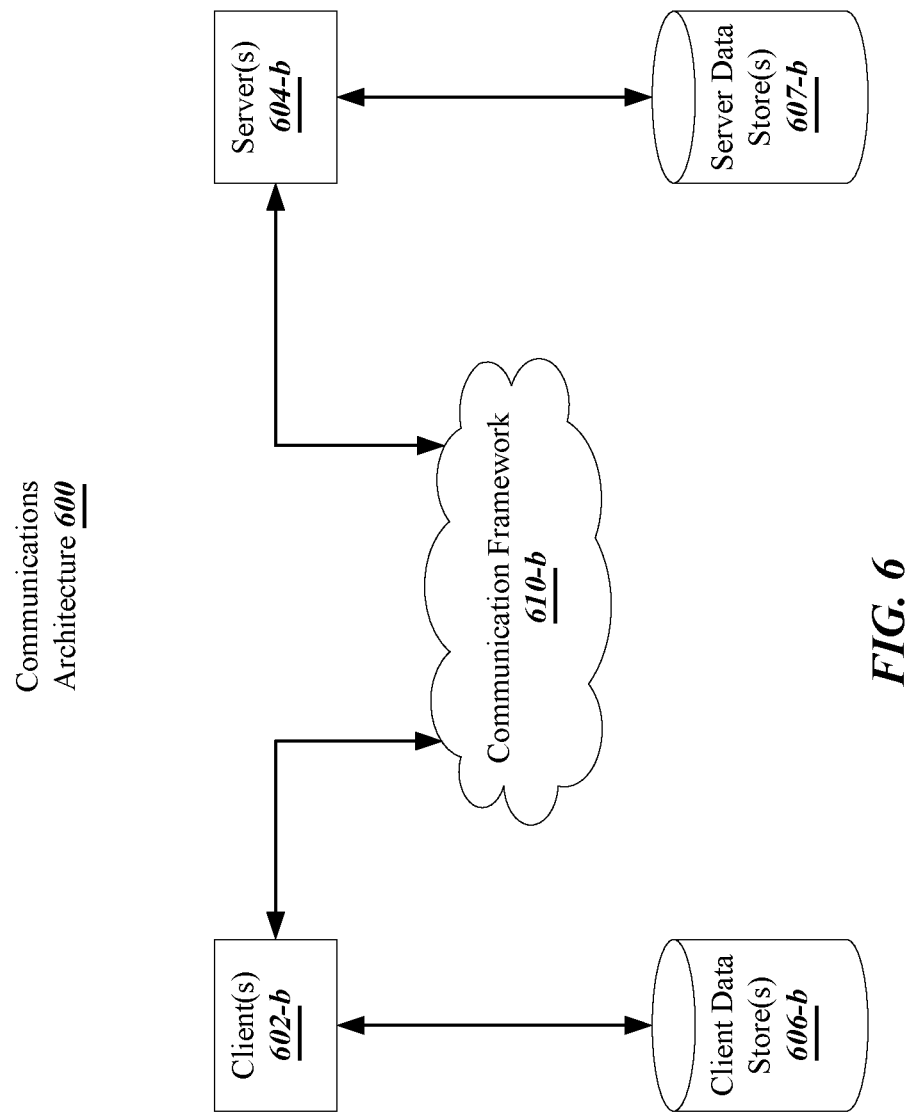
FIG. 6 illustrates an embodiment of a communications architecture useful with at least one embodiment of the present disclosure.

FIG. 6 is a block diagram depicting an exemplary communications architecture 600 suitable for implementing one or more embodiments as previously described. The communications architecture 600 includes various common communications elements, such as a transmitter, receiver, transceiver, radio, network interface, baseband processor, antenna, amplifiers, filters, power supplies, and so forth. The embodiments, however, are not limited to implementation by the communications architecture 600, which may be consistent with system 100.

As shown in FIG. 6, the communications architecture 600 includes one or more clients 602 and servers 604. The clients 602 and the servers 604 are operatively connected to one or more respective client data stores 606 and server data stores 607 that can be employed to store information local to the respective clients 602 and servers 604, such as cookies and/or associated contextual information.

The clients 602 and the servers 604 may communicate information between each other using a communication framework 610. The communications framework 610 may implement any well-known communications techniques and protocols. The communications framework 610 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 610 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.1a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 602 and the servers 604. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

One or more embodiments of systems, computer program products, methods, and techniques for training and using MLMs and tags associated with those MLMs in the vehicular context are provided above and herein. However, at least one of the above embodiments could be adjusted and applied to any product or service that is associated with reviews, including expert or user reviews, including but not limited to real estate, video games, sporting equipment, books, and media, etc. ("other product and/or service"). In at least one embodiment, the MLM or MLMs and any generated tags associated therewith, including tags part of a co-occurrence matrix, and as employed by associated systems, components, methods, and techniques, would be trained as discussed herein, with at least one adjustment, i.e. that training of an MLM or MLMs would be from a source, e.g., review databases and datasets associated with the other product and/or service (where the sources have language in association with specific features associated with the other product and/or service). In at least one embodiment, the MLM trained from the review sources associated with that other product and/or service could be used to provide a specific feature suggestion with respect to that other product and/or service to a user and/or service and/or to generate one or more tags useful for assisting a user with making an automobile selection and/or to construct a co-occurrence matrix for the same. In at least one embodiment, the MLM can have feedback adjustments (e.g., based on user selection) as discussed herein. In at least one embodiment, the web-traffic and/or data of a user, and a score (e.g. frequency based) in relation thereto, in relation to that other product and/or service can be used, in addition to the one or more tags and/or information and scores associated with the one or more tags, can be used to provide the user with the recommendation or suggestion.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

One or more embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A method, comprising:
comparing, by a processor, one or more automobile terms to a plurality of automobile tags to identify a subset of a plurality of automobile makes and models, wherein the automobile terms are associated with a plurality of web pages and a plurality of search queries, wherein the plurality of automobile tags are generated based on a term frequency model applied to a plurality of terms in a corpus of reviews of a plurality of automobiles; and
transmitting, by the processor, a suggestion based on the comparison to a requesting device, the suggestion comprising at least one of: (i) a particular automobile of the subset of automobile makes and models, or (ii) a subset of the plurality of tags associated with the subset of automobile makes and models.

2. The method of claim 1, further comprising:
receiving, by the processor from a web plugin of a web browser of the requesting device, data comprising: one or more web pages of the plurality of web pages accessed by the requesting device, and one or more search queries of the plurality of search queries submitted by the requesting device to a search engine.

3. The method of claim 2, wherein the suggestion is transmitted to the web plugin, the method further comprising:
aggregating, by the processor, the data received from the web plugin of the web browser, wherein the aggregated data is associated with the plurality of automobile makes and models.

4. The method of claim 1, wherein each one of the plurality of automobile makes and models is associated with a respective probability value of a plurality of probability values in a probability distribution.

5. The method of claim 1, further comprising:
applying, by the processor, a term frequency-inverse document frequency (TF-IDF) model to the plurality of terms in the corpus of reviews to compute a respective score for each term in the corpus of reviews, wherein the plurality of tags are limited to a subset of the terms in the corpus of reviews having scores computed by the TF-IDF model that exceed a threshold score, wherein the term frequency model is the TF-IDF model.

6. The method of claim 5, further comprising:
generating, by the processor, a weighted score for each of the plurality of tags based on the scores computed by the TF-IDF model and the comparison of the one or more automobile terms to the plurality of automobile tags.

7. The method of claim 1, wherein the suggestion is with respect to selection, by the requesting device, of a web page associated with the particular automobile, and wherein the method further comprises:
determining, by the processor, a frequency of the one or more automobile terms discussed in relation to one or more automobile makes and models of the plurality of web pages; and
generating, by the processor, a weighted score for each automobile make or model based on the determined frequencies and a respective score computed by a term frequency-inverse document frequency (TF-IDF) model for each of the plurality of terms, wherein the term frequency model is the TF-IDF model.

8. A system, comprising:
a processor; and
a memory storing instructions that when executed by the processor cause the processor to:
compare one or more automobile terms to a plurality of automobile tags to identify a subset of a plurality of automobile makes and models, wherein the automobile terms are associated with a plurality of web pages and a plurality of search queries, wherein the plurality of automobile tags are generated based on a term frequency model applied to a plurality of terms in a corpus of reviews of a plurality of automobiles; and
transmit a suggestion based on the comparison to a requesting device, the suggestion comprising at least one of: (i) a particular automobile of the subset of automobile makes and models, or (ii) a subset of the plurality of tags associated with the subset of automobile makes and models.

9. The system of claim 8, the memory storing instructions that when executed by the processor cause the processor to:
receive, from a web plugin of a web browser of the requesting device, data comprising: one or more web pages of the plurality of web pages accessed by the requesting device, and one or more search queries of the plurality of search queries submitted by the requesting device to a search engine.

10. The system of claim 9, wherein the suggestion is transmitted to the web plugin, the memory storing instructions that when executed by the processor cause the processor to:
aggregate the data received from the web plugin of the web browser, wherein the aggregated data is associated with the plurality of automobile makes and models.

11. The system of claim 8, wherein each one of the plurality of automobile makes and models is associated with a respective probability value of a plurality of probability values in a probability distribution.

12. The system of claim 8, the memory storing instructions that when executed by the processor cause the processor to:
apply a term frequency-inverse document frequency (TF-IDF) model to the plurality of terms in the corpus of reviews to compute a respective score for each term in the corpus of reviews, wherein the plurality of tags are limited to a subset of the terms in the corpus of reviews having scores computed by the TF-IDF model that exceed a threshold score, wherein the term frequency model is the TF-IDF model.

13. The system of claim 12, the memory storing instructions that when executed by the processor cause the processor to:
generate a weighted score for each of the plurality of tags based on the scores computed by the TF-IDF model and the comparison of the one or more automobile terms to the plurality of automobile tags.

14. The system of claim 8, wherein the suggestion is with respect to selection, by the requesting device, of a web page associated with the particular automobile, the memory storing instructions that when executed by the processor cause the processor to:
determine a frequency of the one or more automobile terms discussed in relation to one or more automobile makes and models of the plurality of web pages; and
generate a weighted score for each automobile make or model based on the determined frequencies and a respective score computed by a term frequency-inverse document frequency (TF-IDF) model for each of the plurality of terms, wherein the term frequency model is the TF-IDF model.

15. A non-transitory computer-readable storage medium storing computer-readable program code executable by a processor to cause the processor to:
compare one or more automobile terms to a plurality of automobile tags to identify a subset of a plurality of automobile makes and models, wherein the automobile terms are associated with a plurality of web pages and a plurality of search queries, wherein the plurality of automobile tags are generated based on a term frequency model applied to a plurality of terms in a corpus of reviews of a plurality of automobiles; and
transmit a suggestion based on the comparison to a requesting device, the suggestion comprising at least one of: (i) a particular automobile of the subset of automobile makes and models, or (ii) a subset of the plurality of tags associated with the subset of automobile makes and models.

16. The non-transitory computer-readable storage medium of claim 15, storing computer-readable program code executable by the processor to cause the processor to:
receive, from a web plugin of a web browser of the requesting device, data comprising: one or more web pages of the plurality of web pages accessed by the requesting device, and one or more search queries of the plurality of search queries submitted by the requesting device to a search engine.

17. The non-transitory computer-readable storage medium of claim 16, wherein the suggestion is transmitted to the web plugin, the medium storing computer-readable program code executable by the processor to cause the processor to:

aggregate the data received from the web plugin of the web browser, wherein the aggregated data is associated with the plurality of automobile makes and models.

18. The non-transitory computer-readable storage medium of claim 15, wherein each one of the plurality of automobile makes and models is associated with a respective probability value of a plurality of probability values in a probability distribution.

19. The non-transitory computer-readable storage medium of claim 15, storing computer-readable program code executable by the processor to cause the processor to:
apply a term frequency-inverse document frequency (TF-IDF) model to the plurality of terms in the corpus of reviews to compute a respective score for each term in the corpus of reviews, wherein the plurality of tags are limited to a subset of the terms in the corpus of reviews having scores computed by the TF-IDF model that exceed a threshold score, wherein the term frequency model is the TF-IDF model.

20. The non-transitory computer-readable storage medium of claim 19, storing computer-readable program code executable by the processor to cause the processor to:
generate a weighted score for each of the plurality of tags based on the scores computed by the TF-IDF model and the comparison of the one or more automobile terms to the plurality of automobile tags.

* * * * *